(12) United States Patent
Mansell et al.

(10) Patent No.: US 10,423,467 B2
(45) Date of Patent: Sep. 24, 2019

(54) DATA PROCESSING APPARATUS AND METHOD FOR PERFORMING LOCK-PROTECTED PROCESSING OPERATIONS FOR MULTIPLE THREADS

(71) Applicant: ARM LIMITED, Cambridge (GB)

(72) Inventors: David Hennah Mansell, Norwich (GB); Timothy Holroyd Glauert, Little Shelford (GB)

(73) Assignee: ARM Limited, Cambridge (GB)

( * ) Notice: Subject to any disclaimer, the term of this patent is extended or adjusted under 35 U.S.C. 154(b) by 49 days.

(21) Appl. No.: 15/322,882

(22) PCT Filed: May 19, 2015

(86) PCT No.: PCT/GB2015/051469
§ 371 (c)(1),
(2) Date: Dec. 29, 2016

(87) PCT Pub. No.: WO2016/005720
PCT Pub. Date: Jan. 14, 2016

(65) Prior Publication Data
US 2017/0139757 A1    May 18, 2017

(30) Foreign Application Priority Data

Jul. 8, 2014    (GB) .................................. 1412082.8

(51) Int. Cl.
*G06F 9/52*    (2006.01)
*G06F 9/38*    (2018.01)
*G06F 9/30*    (2018.01)

(52) U.S. Cl.
CPC ............ *G06F 9/526* (2013.01); *G06F 9/3009* (2013.01); *G06F 9/30087* (2013.01); *G06F 9/3851* (2013.01)

(58) Field of Classification Search
CPC ....................................................... G06F 9/526
See application file for complete search history.

(56) References Cited

U.S. PATENT DOCUMENTS

2005/0268106 A1* 12/2005 Mansell ............... G06F 1/3228
713/182
2010/0083266 A1    4/2010 Dai et al.
(Continued)

FOREIGN PATENT DOCUMENTS

| CN | 101854302 | 10/2010 |
|---|---|---|
| EP | 0 747 815 | 12/1996 |

OTHER PUBLICATIONS

International Search Report and Written Opinion of the ISA for PCT/GB2015/051469, dated Jul. 28, 2015, 13 pages.
(Continued)

*Primary Examiner* — Sisley N Kim
(74) *Attorney, Agent, or Firm* — Nixon & Vanderhye P.C.

(57) ABSTRACT

A data processing apparatus and method are provided for executing a plurality of threads. Processing circuitry performs processing operations required by the plurality of threads, the processing operations including a lock-protected processing operation with which a lock is associated, where the lock needs to be acquired before the processing circuitry performs the lock-protected processing operation. Baton maintenance circuitry is used to maintain a baton in association with the plurality of threads, the baton forming a proxy for the lock, and the baton maintenance circuitry being configured to allocate the baton between the threads. Via communication between the processing circuitry and the baton maintenance circuitry, once the lock has been acquired for one of the threads, the processing circuitry performs the lock-protected processing operation for multiple threads before the lock is released, with the baton maintenance circuitry identifying a current thread amongst the multiple (Continued)

threads for which the lock-protected processing operation is to be performed by allocating the baton to that current thread. The baton can hence be passed from one thread to the next, without needing to release and re-acquire the lock. This provides a significant performance improvement when performing lock-protected processing operations across multiple threads.

24 Claims, 12 Drawing Sheets

(56) References Cited

U.S. PATENT DOCUMENTS

| | | | | |
|---|---|---|---|---|
| 2013/0290967 A1* | 10/2013 | Calciu | .................... | G06F 9/526 718/102 |
| 2015/0205733 A1* | 7/2015 | Steinmacher-Burow | .................... | G06F 9/526 711/150 |

OTHER PUBLICATIONS

Search Report for GB 1412082.8 dated Jan. 14, 2015, 3 pages.
Dice et al., "Lock cohorting", Proceedings of the 17$^{th}$ ACM Sigplan symposium on principles and practice of parallel programming, PPOPP '12, Feb. 25, 2012, pp. 247-256.
Elliott et al., "An Optimal k-Exclusion Real-Time Locking Protocol Motivated by Multi-GPU Systems", Department of Computer Science, University of North Carolina at Chapel Hill, pp. 1-45, Mar. 1, 2013.
Stuart et al., "Efficient Synchronization Primitives for GPUs", arxiv.org. Oct. 20, 2011, 12 pages.
English translation of the First Office Action dated Jul. 25, 2018 in CN Application No. 201580036289.5, 7 pages.
Second Office Action for CN Application No. 201580036289.5 dated Apr. 30, 2019 and English translation, 20 pages.

\* cited by examiner

BATON TABLE

DATA PROCESSING APPARATUS AND METHOD FOR PERFORMING LOCK-PROTECTED PROCESSING OPERATIONS FOR MULTIPLE THREADS

This application is the U.S. national phase of International Application No. PCT/GB2015/051469 filed 19 May 2015, which designated the U.S. and claims priority to GB Patent Application No. 1412082.8 filed 8 Jul. 2014, the entire contents of each of which are hereby incorporated by reference.

FIELD OF THE INVENTION

The present invention relates to a data processing apparatus and method for performing lock-protected processing operations for multiple threads.

BACKGROUND OF THE INVENTION

It is known to provide a data processing apparatus that is configured to execute a plurality of threads. Each thread will typically require a series of processing operations to be performed, and each thread will typically comprise a sequence of instructions defining those processing operations.

It is also known to utilise a lock as a synchronisation mechanism for limiting access to an associated resource (for example a shared data structure) within the data processing system when there are multiple threads of execution. If a processing operation requires access to a resource that is protected by a lock, then that processing operation will be referred to herein as a lock-protected processing operation, and prior to performing such a lock-protected processing operation for a particular thread, it will need to be ensured that the lock is acquired. Locks can take a variety of forms (and the present invention can be applied irrespective of the underlying form of lock), but one commonly used form is a binary value stored at a particular address in memory. To acquire the lock, the processing circuitry looks up the value at the lock address in memory, and if it is at a first value indicating that the lock is available (for example zero), then the lock is acquired by setting the data value to a second value to indicate that the lock has been acquired (for example one). Whilst the lock is acquired for a particular thread, any other thread seeking to acquire the look will determine on reading from the lock address that the lock is currently at the second value, and accordingly is already acquired. The lock-protected processing operation for that other thread can then not be performed until the thread has been released, and then subsequently acquired by that other waiting thread.

Accordingly, when multiple threads include a lock-protected processing operation that is protected by the same lock, then the lock-protected processing operation will only be able to be executed for one thread at a time. The lock-protected processing operation can be an identical operation to be performed by each thread, for example where each of the threads is executing the same program code, or may be a different processing operation in different threads, for example where one thread wishes to perform a processing operation to access a shared resource in order to add values to a list in that shared resource, whilst another thread wishes to perform a processing operation to delete values from the list in that shared resource.

The one or more instructions specifying a lock-protected processing operation will be referred to herein as a critical code section, and accordingly a critical code section is a part of a multi-threaded program which can only be safely executed by one thread at a time, for example because it updates a shared data structure. When encountering a critical code section within a particular thread, the lock is first acquired (which prevents any other thread acquiring the lock until it is released), and after completing the critical code section, the lock is released. Such an approach allows critical code sections of arbitrary complexity to be supported by any hardware which can support a lock mechanism.

However, to ensure correct operation, the lock mechanism must involve communication and synchronisation between threads, such that all threads understand which thread has the lock at any one time, and furthermore this mechanism must be invoked each time the lock is acquired and released (i.e. each time each thread wants to execute the lock-protected processing operation). Typically this is achieved using atomic operations which ensure that only a single thread can acquire the lock at a time. The acquisition of a lock is hence a relatively time consuming process, involving the execution of multiple instructions, and read and write accesses to the lock address in memory. It would accordingly be desirable to provide a more efficient mechanism for handling lock-protected processing operations when executing multiple threads on a data processing apparatus.

SUMMARY OF THE INVENTION

Viewed from a first aspect, the present invention provides a data processing apparatus for executing a plurality of threads, comprising: processing circuitry configured to perform processing operations required by said plurality of threads, said processing operations including a lock-protected processing operation with which a lock is associated, the lock needing to be acquired before the processing circuitry performs the lock-protected processing operation; and baton maintenance circuitry configured to maintain a baton in association with the plurality of threads, the baton forming a proxy for the lock, and the baton maintenance circuitry being configured to allocate the baton between the plurality of threads; the processing circuitry being configured to communicate with the baton maintenance circuitry so that, once the lock has been acquired for one of said plurality of threads, the processing circuitry performs the lock-protected processing operation for multiple threads of said plurality of threads before the lock is released, the baton maintenance circuitry being configured to identify a current thread amongst said multiple threads for which the lock-protected processing operation is to be performed by allocating the baton to that current thread.

In accordance with the present invention, baton maintenance circuitry is provided to maintain a baton in association with a plurality of threads. The baton forms a proxy for the lock, and the baton maintenance circuitry allocates the baton between the threads. In one embodiment, the baton maintenance circuitry arranges that the baton is only allocated to one thread at a time. When seeking to perform a lock-protected processing operation for multiple of the threads, the baton mechanism of the present invention ensures that the lock only needs to be acquired and released once, rather than having to be acquired and released separately for each individual thread. In particular, once the lock has been acquired for a first one of the threads, the baton is passed between the multiple threads to cause the lock-protected processing operation to be performed for each of those threads, whilst all the time the lock remains acquired. Once the lock-protected processing operation has been performed for all of the multiple threads, the lock is then released. In one embodiment, this mechanism is used to cause the cause the lock-protected processing operation to be performed sequentially for each of the threads, before the lock is then released.

Such an approach ensures the correct handling of the lock-protected processing operation, by ensuring that one thread executes the lock-protected processing operation at a time, whilst reducing the overhead associated with acquiring and releasing the lock. This can hence give rise to significant performance improvements within data processing systems that execute a plurality of threads, particularly in situations where that plurality of threads include a significant number of lock-protected processing operations.

The baton is associated with the lock. Hence, in embodiments where multiple locks are used, separate batons will be associated with each lock.

There are a number of ways in which the processing circuitry can communicate with the baton maintenance circuitry in order to implement the above-discussed functionality. In one embodiment, for a requiring thread that requires the lock-protected processing operation to be performed, the processing circuitry is configured to request the baton maintenance circuitry to allocate the baton to that requiring thread, the baton maintenance circuitry being configured, if the baton is not currently allocated to another thread, to allocate the baton to the requiring thread and to cause the processing circuitry to acquire the lock. Hence, if the lock has not yet been acquired, the baton can be allocated to the thread that is seeking to perform the lock-protected processing operation, with the processing circuitry then being caused to acquire the lock prior to the lock-protected processing operation being performed.

In one embodiment the baton may be permanently in existence and hence in the above situation the "allocation" process merely involves identifying in any appropriate manner that the requiring thread now has been assigned that baton. In an alternative embodiment (which avoids the need for a baton to be in existence for every single lock at all times), the baton may be created and terminated as required, and hence in the above situation the "allocation process" involves creating the baton and then identifying in any appropriate manner that the requiring thread now has been assigned that baton.

Further, in one embodiment, if at the time the baton maintenance circuitry is requested to allocate the baton to a requiring thread, it is determined that the baton is currently allocated to another thread, this indicates that the lock-protected processing operation is already being performed for that other thread (or that other thread is in the process of acquiring the lock so that the lock-protected processing operation can be performed), and in that event the baton maintenance circuitry maintains in association with the baton an indication that the requiring (subsequent) thread is awaiting the baton, and causes the processing circuitry to stall execution of that requiring thread whilst awaiting allocation of the baton.

By such an approach, one or more threads can be caused to stall awaiting allocation of the baton, whilst the lock-protected processing operation is being performed for a thread that has currently been allocated the baton. Once the thread that has been currently allocated the baton has finished performing the lock-protected processing operation, the baton can then be reallocated to one of the stalled threads to enable that thread to then resume, and perform the lock-protected processing operation, without any need for the lock to be released and reacquired.

There are a number of ways in which the processing circuitry may request the baton maintenance circuitry to allocate the baton to a thread. In one embodiment, each thread comprises a sequence of instructions, and for a requiring thread that requires the lock-protected processing operation to be performed, the requiring thread includes a get baton instruction which when executed by the processing circuitry causes the processing circuitry to request the baton maintenance circuitry to allocate the baton to that thread. Hence, in this embodiment an explicit instruction is added into the instruction sequence to trigger the request for the baton from the baton maintenance circuitry.

Execution of a get baton instruction may be implemented in a variety of ways. For example, in one embodiment, execution of the get baton instruction causes control data to be stored in a register to indicate whether the baton maintenance circuitry requires the processing circuitry to acquire the lock. After the get baton instruction has been executed, the processing circuitry will then typically execute one or more further instructions to analyse the control data in the register in order to determine whether the lock needs to be acquired or not.

The sequence of instructions forming the thread will typically include lock acquiring code. In an alternative implementation of the get baton instruction, execution of the get baton instruction does not require any control data to be written into a register, and instead execution of the get baton instruction will incorporate the required branching functionality to branch past the lock acquiring code if the baton maintenance circuitry does not require the processing circuitry to acquire the lock. Otherwise, execution of the get baton instruction will not cause such a branch to occur, and instead execution will continue to the lock acquiring code in order to cause the lock to be acquired. This avoids the need to write the control data into a register, or the need to execute the one or more further instructions otherwise needed to analyse the control data. In one embodiment, the address to branch to in such circumstances would be provided as part of the get baton instruction and accordingly it is a combination of hardware and software that implements the required branching behaviour.

In addition to providing a mechanism for requesting the baton maintenance circuitry to allocate the baton to a thread, a mechanism is also provided to release the baton and allow it to be passed to a waiting thread. In particular, in one embodiment, when the processing circuitry has performed the lock-protected processing operation for a thread, the processing circuitry is configured to issue a pass baton request to the baton maintenance circuitry, the baton maintenance circuitry being responsive to the pass baton request to determine whether there are any remaining threads amongst said multiple threads for which the lock-protected processing operation still needs to be performed, and if so to allocate the baton to one of said remaining threads. Hence, in such an event, the baton is merely reallocated to another thread awaiting performance of the lock-protected processing operation, without the underlying lock needing to be released and reacquired.

In one embodiment, if the baton maintenance circuitry determines that there are no remaining threads amongst said multiple threads for which the lock-protected processing operation still needs to be performed, the baton maintenance circuitry is configured to de-allocate the baton and to cause the processing circuitry to release the lock. Hence, the lock is subsequently released when there are no further threads awaiting execution of the lock-protected processing operation.

In one embodiment the baton may be permanently in existence and hence in the above situation the "de-allocation" process merely involves identifying in any appropriate manner that there are no threads assigned to that baton. In an alternative embodiment the baton may be created and terminated as required, and hence in the above situation the "de-allocation process" involves terminating (closing) the baton.

There are a number of ways in which the processing circuitry can trigger the pass baton functionality discussed above. In one embodiment, each thread comprises a sequence of instructions, and for a thread that requires the lock-protected processing operation to be performed, the thread includes a pass baton instruction which is executed by the processing circuitry once the lock-protected processing operation has been performed for that thread, and which causes the processing circuitry to issue the pass baton request to the baton maintenance circuitry.

In one embodiment, execution of the pass baton instruction causes control data to be stored in a register to indicate whether the baton maintenance circuitry requires the processing circuitry to release the lock. The processing circuitry can then execute one or more further instructions in order to analyse that control data and determine whether the lock needs to be released or not.

In an alternative embodiment, the functionality of those one or more further instructions is implemented directly into the pass baton instruction, such that execution of the pass baton instruction causes processing to branch past lock releasing code if the baton maintenance circuitry does not require the processing circuitry to release the lock. This avoids the need to write the control data into a register, or the need to execute the one or more further instructions otherwise needed to analyse the control data.

In one embodiment, the lock is stored in memory and the apparatus is configured to acquire the lock via performance of an atomic operation. As a result, there is a significant overhead associated with acquiring the lock.

In contrast, the baton is not typically stored in memory. Instead, in one embodiment the data processing apparatus further comprises a storage structure, associated with said plurality of threads, in which the baton maintenance circuitry is configured to maintain the baton. Hence, whilst the lock is a global entity stored in memory, and potentially referenced by various components within the data processing apparatus, the baton is a local feature maintained in a storage structure and specifically associated with the plurality of threads. Due to its local applicability to the plurality of threads, there is no need for performance of atomic operations to control access to the baton.

The local nature of the baton is particularly beneficial in certain embodiments. For example in one embodiment the apparatus may provide multiple baton domains, and for each baton domain a separate baton may be locally maintained to form a proxy for the lock in that baton domain. Hence, for the same lock, different batons may be locally provided in each of multiple baton domains.

The storage structure can take a variety of forms. However, in one embodiment the storage structure comprises an entry for the baton, the entry comprising a lock identifier field identifying the lock for which the baton is forming a proxy, and a remaining threads field identifying any remaining threads amongst said multiple threads for which the lock-protected processing operation still needs to be performed. The lock identifier field can take a variety of forms, provided that it uniquely identifies the lock for which the baton is forming a proxy. In one embodiment, the lock identifier field is formed from the memory address identifying the location of the lock in memory.

In one embodiment, the entry further comprises an active thread field identifying the thread currently allocated the baton. Whilst in some embodiments the entry does not need to include explicitly an active thread field to identify the thread currently allocated the baton, the presence of such an active thread field enables certain additional checks to be performed. For example, when a thread is seeking to pass the baton, it can first be assessed whether that thread seeking to pass the baton is the thread that the entry currently considers to be the active thread allocated the baton.

In one embodiment, the processing operations may include multiple lock-protected processing operations, at least some of which have different locks associated therewith, and the baton maintenance circuitry is configured to maintain, in association with the plurality of threads, a plurality of batons, each baton being a proxy for one of the locks. Hence, a different baton can be provided for each different lock, each baton being restricted for use with the associated plurality of threads.

In such an embodiment, the storage structure will typically comprise a plurality of entries, each entry being associated with a different baton.

As mentioned earlier, in one embodiment the data processing apparatus comprises one or more baton domains, and for each baton domain the baton maintenance circuitry is configured to maintain a separate baton to form a proxy for the lock in that baton domain. Hence, for the same lock, different batons may be provided in each of multiple baton domains. Whilst the lock is hence a global entity relevant to all of the baton domains, the baton itself is a local entity associated with a particular baton domain. This has the benefit that for each baton domain the associated baton maintenance circuitry can be local in scope, and hence simpler, whilst correctness of operation is still ensured by the global lock (because the lock-protected processing operation is never executed without the lock having been acquired).

In one embodiment, the plurality of threads form a thread group, and the processing circuitry is further configured to perform processing operations required by threads of at least one further thread group, the threads of said at least one further thread group also requiring the lock-protected processing operation to be performed.

There are a number of ways in which the various thread groups can be allocated to baton domains. For example, in one embodiment one baton domain may comprise multiple thread groups, and in that event the baton maintenance circuitry will maintain the same baton for those multiple thread groups. In such an arrangement, the baton may be passed sequentially between the threads of one thread group, and then between the threads of the next thread group, without needing to release and reacquire the lock.

In an alternative embodiment, each thread group may be in a different baton domain, such that the baton maintenance circuitry is configured to maintain a separate baton in association with each thread group. In such an arrangement, once the lock has been acquired by one of the baton domains, the associated baton may be passed between the threads within the thread group of that baton domain, and once the lock-protected processing operation has been performed for all of the required threads of that thread group, the lock can be released, at which point it can be acquired for the thread group of a different baton domain. Each of the above two alternative approaches have different advantages. In particular, having a single larger domain reduces traffic to the global lock, but having smaller domains promotes fairness (because the lock is contended more often).

The threads within a thread group can take a variety of forms. In one embodiment, the plurality of threads within a thread group are processed in parallel with a common program being executed for each thread of the thread group. This effectively enables the same piece of code to be executed multiple times for different input data. In one particular implementation, each thread has an associated program counter, and in addition the data processing apparatus has a general program counter. The data processing apparatus seeks to execute the various threads of the thread group in lock step, and in particular an instruction is executed in parallel on all threads whose associated program counter matches the general program counter. When reaching a lock-protected processing operation, it will then not be possible to continue to execute each instruction in parallel across multiple threads. Instead, one of the threads will be successful in acquiring the lock, and will be the thread that gets allocated the baton. The instruction(s) specified by the lock-protected processing operation will then be executed sequentially for each thread in turn, with the baton being passed between the threads to allow the lock-protected processing operation to be performed sequentially for each of the threads, without needing to release and reacquire the lock. The lock can then be released once the lock-protected processing operation has been performed for all of the threads. At this point, it may then be possible to continue with the earlier described lock step execution of each instruction across the multiple threads. Such processing of multiple threads in lock step may be referred to as "Single Instruction Multiple Thread (SIMT)" processing.

Considering the earlier discussion of how baton domains may be allocated to thread groups, in one embodiment adopting such SIMT processing, it is beneficial to allocate a baton domain to each separate thread group (as it frees up a thread group to do something else), but may not be as beneficial to share a baton domain across a collection of thread groups as it can potentially starve out other thread groups in the system.

There are a number of situations where such SIMT processing can be particularly useful. For example, in one embodiment, such SIMT processing may be implemented within a graphics processing unit (GPU) in order to allow a particular piece of code to be executed in parallel across multiple sets of input data. The baton mechanism of the above described embodiments is particularly beneficial in such an arrangement, since it allows the lock to be acquired and retained whilst the lock-protected processing operation is performed sequentially for each of the threads of the thread group, hence improving the performance of such SIMT processing in situations where the commonly executed code includes one or more critical code sections that need to be executed only by one thread at a time.

Viewed from a second aspect, the present invention provides a method of executing a plurality of threads within a data processing apparatus, comprising: performing processing operations required by said plurality of threads within processing circuitry of the data processing apparatus, said processing operations including a lock-protected processing operation with which a lock is associated, the lock needing to be acquired before the processing circuitry performs the lock-protected processing operation; maintaining a baton in association with the plurality of threads, the baton forming a proxy for the lock, and allocating the baton between the plurality of threads; and once the lock has been acquired for one of said plurality of threads, performing the lock-protected processing operation for multiple threads of said plurality of threads before the lock is released, and identifying to the processing circuitry a current thread amongst said multiple threads for which the lock-protected processing operation is to be performed by allocating the baton to that current thread.

Viewed from a third aspect, the present invention provides a data processing apparatus for executing a plurality of threads, comprising: processing means for performing processing operations required by said plurality of threads, said processing operations including a lock-protected processing operation with which a lock is associated, the lock needing to be acquired before the processing means performs the lock-protected processing operation; and baton maintenance means for maintaining a baton in association with the plurality of threads, the baton forming a proxy for the lock, and the baton maintenance means further for allocating the baton between the plurality of threads; the processing means for communicating with the baton maintenance means so that, once the lock has been acquired for one of said plurality of threads, the processing means performs the lock-protected processing operation for multiple threads of said plurality of threads before the lock is released, the baton maintenance means for identifying a current thread amongst said multiple threads for which the lock-protected processing operation is to be performed by allocating the baton to that current thread.

Viewed from a fourth aspect, the present invention provides a computer program product storing in a non-transitory form a computer program for controlling a computer to provide a virtual machine execution environment for program instructions corresponding to a data processing apparatus in accordance with the first aspect of the present invention.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
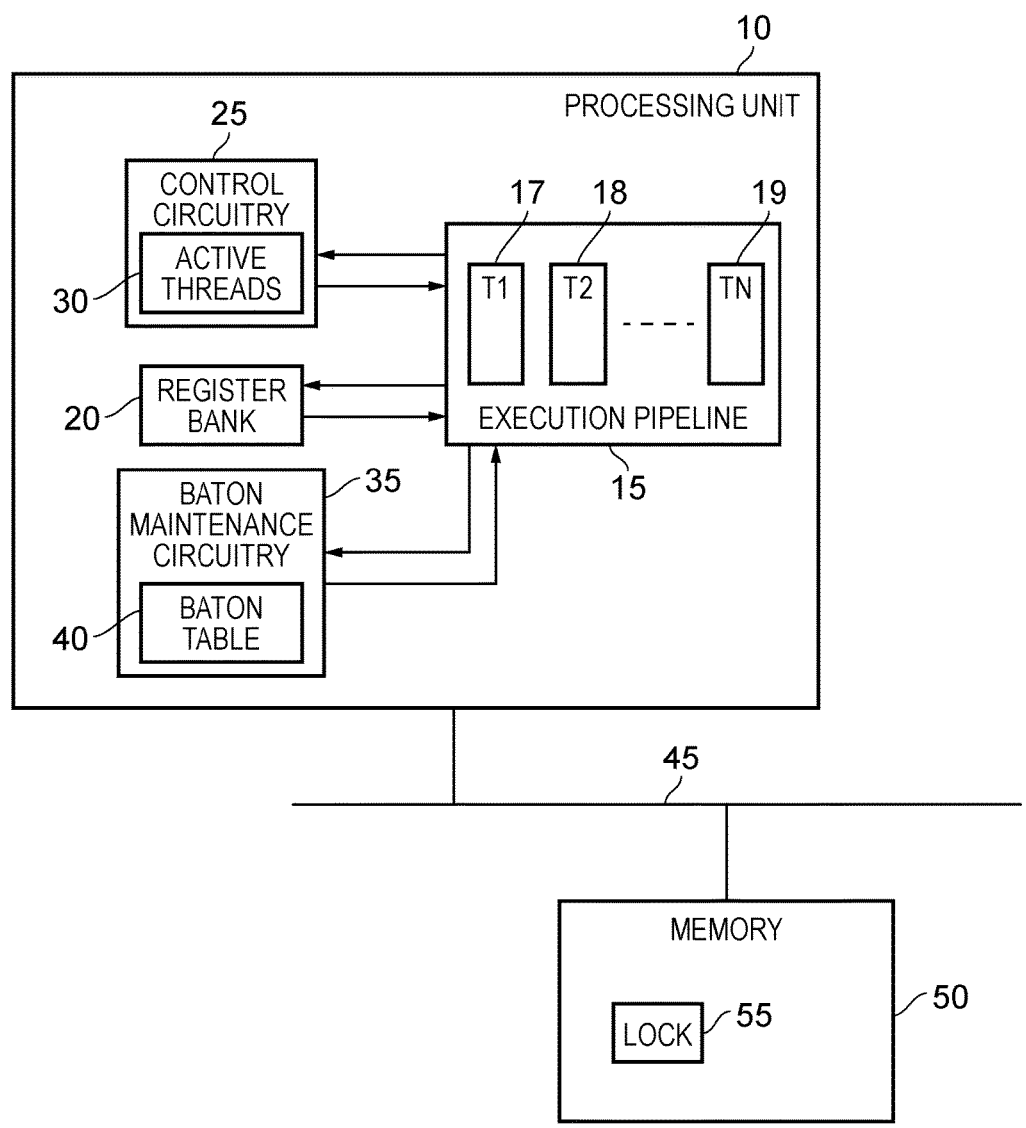
FIG. 1 is a block diagram of a system including a data processing apparatus in accordance with one embodiment.

FIG. 1 is a block diagram of a system including a processing unit 10 forming a data processing apparatus in accordance with one embodiment. The processing unit 10 includes an execution pipeline 15 that is arranged to execute a plurality of threads 17, 18, 19. Each of the threads is arranged to execute a sequence of instructions, and in one embodiment multiple of the threads include at least one critical code section specifying a lock-protected processing operation. Whilst the sequence of instructions specified by each thread may differ, in one particular embodiment each of the threads specifies the same sequence of instructions, and hence by way of example the multiple threads are used to execute a particular sequence of instructions on multiple different sets of data.

During performance of the processing operations required by the threads 17, 18, 19, the execution pipeline will read data values from, and write data values to, a register bank 20 providing a plurality of working registers for the execution pipeline. Control circuitry 25 is used to control the operation of the execution pipeline. The control circuitry 25 in one embodiment includes an active threads list 30 identifying at any particular point in time which of the multiple threads 17, 18, 19 are active, i.e. are threads which the execution pipeline is currently executing instructions for, and which threads are inactive, for example due to them being stalled awaiting a particular event.

For the critical code sections within each thread, it is necessary for a lock 55 in memory 50 to be acquired before those critical code sections are executed. The lock is used as a mechanism to ensure that a critical code section can only be executed by one thread at a time. There are a number of reasons why this may be required, but one typical reason is because the execution of that critical code section will update a shared data structure, and it is important that only one thread is able to update the shared data structure at any particular point in time.

The lock may take a variety of forms, but for the purposes of describing FIG. 1, it will be assumed that the lock 55 takes the form of a data value stored at a particular address (referred to herein as the lock address) within memory 50. To seek to acquire the lock, a particular thread will first seek to read the current value of the lock from the lock address in order to determine whether the lock is available, or has already been acquired. If the lock has a first value (for example zero), this will indicate that the lock is available, whereas if the lock has a second value (for example one), this will indicate that the lock has already been acquired, and accordingly is not available. If the lock is available, then the thread can initiate a write operation in order to update the lock value to the second data value, which will then prevent any other threads from acquiring the lock.

As will be discussed in more detail with reference to FIG. 3, it is important to perform the steps required to acquire the lock as an atomic operation, in order to ensure that only one thread is successful in acquiring the lock. For example, considering the above illustrated example of a lock, where zero indicates that the lock is available, and one indicates that the lock is acquired, two threads might substantially simultaneously read the current lock value, and identify that the lock value is zero. If they are both then able to write one to the lock, they will both assume that they have acquired the lock, and hence proceed to perform the critical code section. It is hence important to ensure that only one thread can successfully write one to the lock, and this is ensured by performing an atomic operation.

The lock is typically a global entity available to multiple components within the system, and accordingly is typically stored in memory, in this example memory 50 accessible via an interconnect 45. Accordingly, the above described process for acquiring the lock involves performing read and write operations to memory via the interconnect 45, which is relatively time consuming and consumes significant energy. Further, the need to construct atomic operations in order to acquire the lock further increases the complexity and time associated with acquiring the lock. If multiple of the threads include critical code sections protected via the same lock, then in accordance with a known technique it would be necessary for each thread to independently seek to acquire the lock, and then for each thread to release the lock once it has finished performing the associated critical code section.

With the aim of improving performance, whilst still ensuring the integrity of the lock mechanism, the processing unit 10 of the illustrated embodiment in FIG. 1 includes a baton mechanism implemented by baton maintenance circuitry 35 within the processing unit 10. The baton maintenance circuitry 35 maintains a baton table 40 that is associated with the plurality of threads, and which, for each lock used by the plurality of threads, maintains a local baton forming a proxy for that lock. The baton maintenance circuitry 35 ensures that at any point in time, only one of the threads 17, 18, 19 is allocated a particular baton.

As will be described in more detail later, when a first of the threads encounters a critical code section protected by the lock 55, it requests the baton associated with that lock from the baton maintenance circuitry 35. Assuming a baton for the relevant lock is not currently in use, then the baton is created by populating an entry of the baton table, and that baton is then allocated to the requesting thread. Execution of that thread will then cause the lock to be acquired, whereafter the critical code section can be executed. When that thread has finished executing the critical code section, it issues a pass baton request to the baton maintenance circuitry, allowing the baton to be passed to any of the other threads that is currently waiting to execute a critical code section protected by the same lock. The baton maintenance circuitry 35 will be aware of such threads, since such threads will have issued a request for the baton to the baton maintenance circuitry, but that request will not yet have been completed, since the baton maintenance circuitry will have determined that the baton has already been allocated to a thread. However, on receipt of the pass baton request, the baton maintenance circuitry can reallocate the baton to one of the waiting threads, to allow the critical code section to be executed by that other thread. This can be done without any need to release the lock 55 stored in memory, and instead the lock will remain acquired throughout this process. Indeed, the operation of the baton mechanism is independent of how the lock mechanism is implemented; through use of the baton mechanism the release/reacquire steps associated with the lock are avoided regardless of what they are.

This process can be repeated for all of the pending threads waiting to execute a critical code section protected by the lock. Once all of the threads have executed the critical code section, the baton can then be invalidated within the baton table, and the execution pipeline 15 can then be caused to release the lock 55 in memory 50.

Figure 2A:
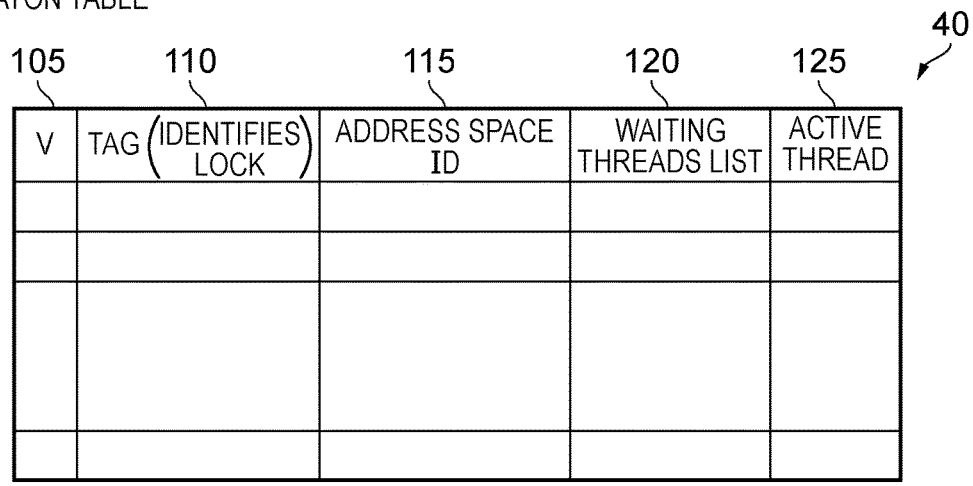
FIG. 2A schematically illustrates the baton table of FIG. 1 in accordance with one embodiment, whilst FIG. 2B schematically illustrates the active threads list of FIG. 1 in accordance with one embodiment.

FIG. 2A schematically illustrates fields provided within each entry of the baton table 40 in accordance with one embodiment. In the illustrated embodiment, a separate entry is provided within the table for each baton that is currently active. Hence, when a baton is created, an available entry within the baton table will be identified (this will be an entry whose valid field 105 is cleared to identify that the entry is currently invalid), and then a tag field 110 will be populated to identify the lock. In one embodiment, the lock address is used as the tag field, since this enables the lock to be uniquely identified. The valid bit 105 will then be set to identify that that entry contains a valid baton.

The waiting threads list field 120 is used to keep a list of all threads that have requested the baton, but which have not yet been allocated the baton. An optional active thread field 125 is provided in which can be recorded the thread that is currently allocated the baton. At the time the baton is created, this will be the requesting thread that has caused the baton to be created. However, in due course the active thread will be chosen from one of the waiting threads in the waiting threads list 120, at which point that chosen thread is removed from the waiting threads list.

The address space ID field 115 is an optional field that can be provided when more than one address space is in use, in order to assist in identifying batons belonging to different address spaces. For example, in a system where threads in the same baton domain run in different address spaces, then it is necessary to identify which batons belong to which address space, and a simple mechanism to achieve this is to provide the address space ID field 115, so that the particular address space to which the baton relates can be captured. Hence, a match will only be found in the baton table if a thread requesting a baton with a particular tag value stored in a valid entry of the baton table also relates to the address space indicated by the address space ID in the field 115. As an alternative approach, in embodiments where all threads active at any given time are associated with the same address space, then on a context switch the contents of the baton table could be swapped out at the same time as the threads are swapped to reflect the change of context.

Figure 2B:
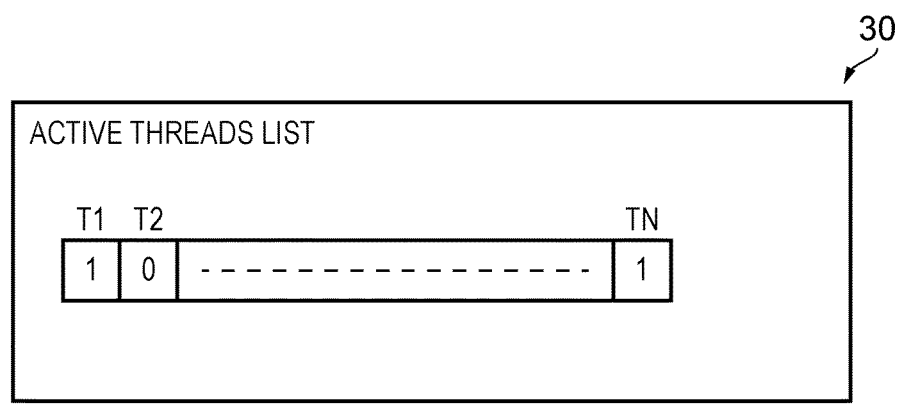

FIG. 2B schematically illustrates the active threads list 30 of FIG. 1 in accordance with one embodiment. In this particular example, a separate bit is provided for each of the threads, and is set to one to identify that the associated thread is active, and is set to zero to identify that the associated thread is inactive. It will be appreciated that the meanings of the one and zero values could be swapped in alternative embodiments. As will be discussed in more detail later, the information in the active threads list 30 can be updated by the baton maintenance circuitry 35 during the processing of requests to acquire and release batons stored in the baton table 40.

Figure 3:
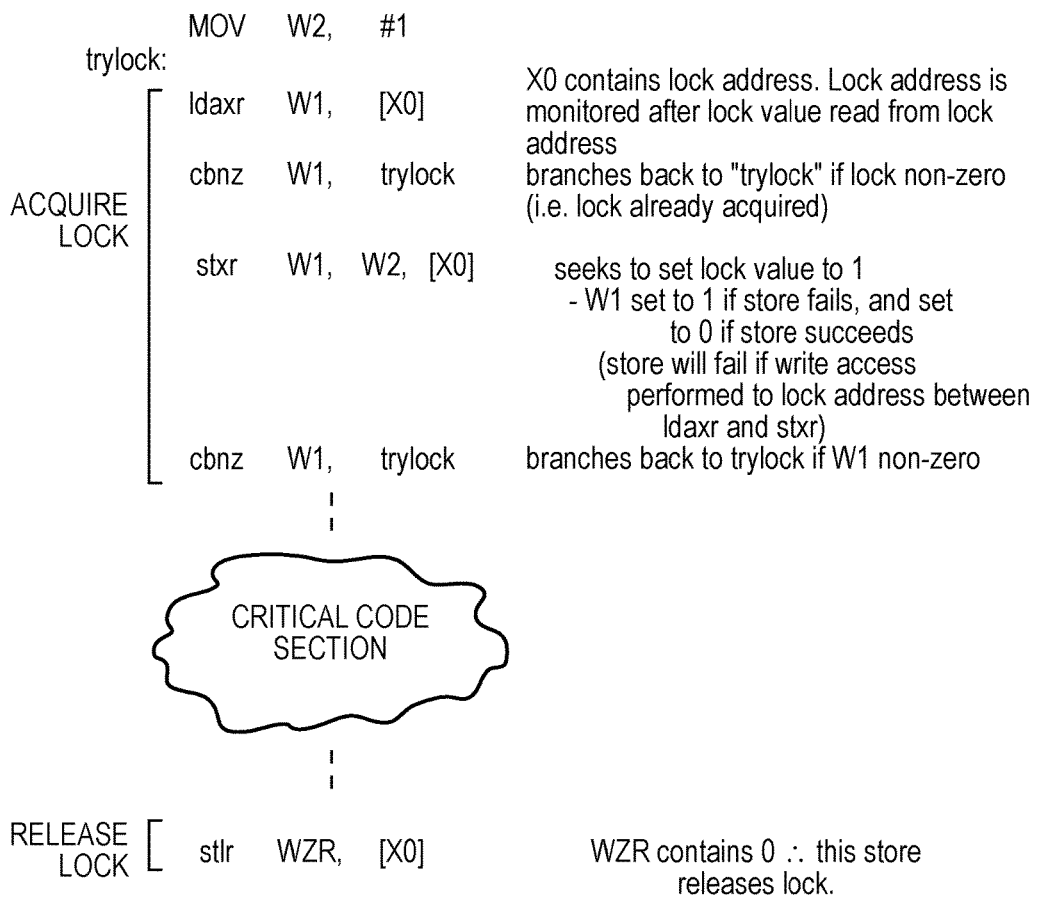
FIG. 3 schematically illustrates a known code sequence for a acquiring and releasing a lock.

FIG. 3 schematically illustrates an example code sequence that may be used to acquire and release a lock, in the absence of the baton mechanism of the described embodiments. In particular, FIG. 3 shows a code sequence associated with a particular thread. In accordance with the illustrated code, registers are identified either by the letter "X" or the letter "W". In the particular example, a register denoted by the letter X is a 64 bit register, and a register identified by the letter W identifies a 32 bit field within the corresponding 64 bit register.

A move instruction is used to store one in the register W2. Thereafter a sequence of instructions is executed in order to seek to atomically acquire the lock. Firstly, a load instruction is performed in order to load into the register W1 the lock value stored at the lock address, the lock address being stored in the register X0. The particular form of load instruction shown continues to monitor the lock address after the lock value has been read, and in particular monitors the lock address in order to detect if any write operation is performed to that lock address before the subsequent store instruction (the stxr instruction) is executed. The cbnz instruction is a compare and branch if non-zero instruction. In particular, if the value stored in the register W1 is non-zero, then the processing branches is back to the trylock position. Accordingly, if the lock is already set to one to indicate that the lock has been acquired, then the process will return to the trylock position in order to repeat the load instruction as a first step in acquiring the lock. Only once the value loaded from the lock address is zero, will the process then proceed to the store instruction. The store instruction then seeks to write to the lock address the value stored in the register W2 (i.e. the value one), and the register W1 is updated to identify whether the store succeeded or not. In particular, the store will only succeed if the monitoring of the lock address initiated by the load instruction indicates that no intervening write access has been performed to the lock address. If the store succeeds, then zero is written into the register W1, whereas otherwise one is written into the register W1.

The subsequent cbnz instruction hence causes the process to return to the trylock position if the value in the register W1 is non-zero, hence indicating that the store has not succeeded. This causes the atomic operation to be retried. Only when the contents in the register W1 are zero does the process then proceed beyond the acquire lock stage, whereafter the critical code section is performed.

The lock is then released by performing the store instruction stlr in order to write to the lock address the contents of a particular register WZR. In this embodiment, WZR is a special register that contains zero. Accordingly, this store process releases the lock.

It will be appreciated that if this process has to be performed independently for each of the threads, then much time and energy can be consumed by each of the threads in seeking to acquire the lock. This is particularly problematic where the threads contain a significant number of critical code sections, or where the threads all execute the same program substantially simultaneously, and hence are seeking to acquire the lock at essentially the same time. This will typically require the load and store operations forming part of the atomic operation for acquiring the lock to be retried multiple times before all of the threads are ultimately successful in acquiring the lock and performing their corresponding critical code section.

Figure 4:
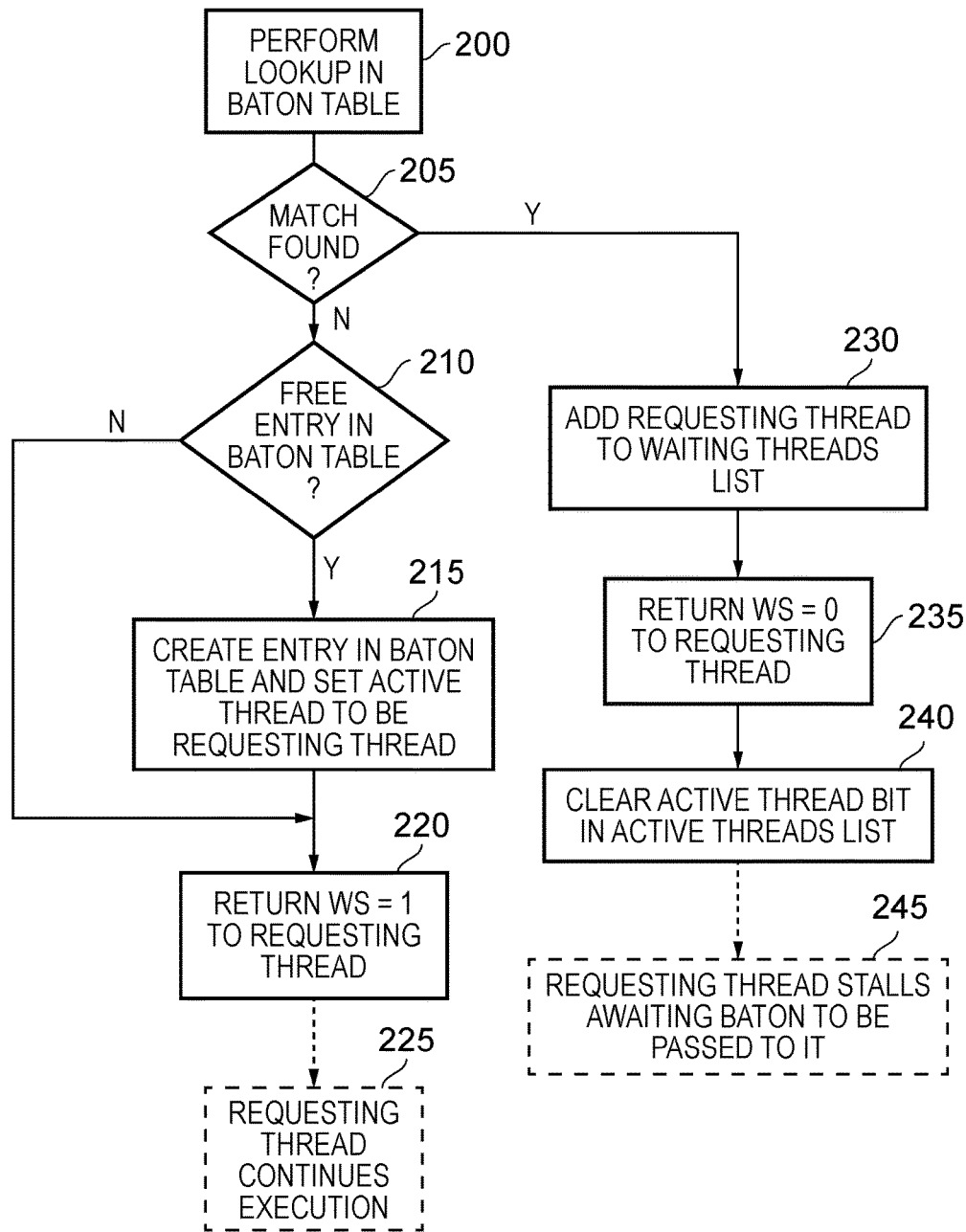
FIG. 4 is a flow diagram illustrating the steps performed by the baton maintenance circuitry in accordance with one embodiment, in response to a get baton instruction being executed by a thread.

FIG. 4 is a flow diagram illustrating the steps performed by the baton maintenance circuitry 35 in accordance with one embodiment in order to implement a baton as a proxy for the lock, and avoid the need for each of the threads to independently seek to acquire and release the lock. In one embodiment, the code associated with each of the threads having a critical code section includes a get baton instruction specifying a tag field and a destination register field Ws. In one embodiment, the tag field identifies the address of the lock for which the baton is to be provided, and the destination register identified by the field Ws is populated by the baton maintenance circuitry to identify whether the lock needs to be acquired once the baton has been allocated to the requesting thread.

When the get baton instruction is executed for a particular thread (referred to herein as the requesting thread), then the execution pipeline 15 contacts the baton maintenance circuitry 35 to cause a look up to be performed in the baton table 40 (see step 200 of FIG. 4). In particular, each of the valid entries in the baton table is evaluated, to determine whether the tag field data 110 for that entry matches the tag specified by the get baton instruction. If present, the address space ID information is also considered in order to determine whether there is a match as discussed earlier.

At step 205, it is determined whether a match has been found. If not, it is then determined at step 210 whether there is a free entry in the baton table. The size of the baton table, and hence the number of entries within the baton table, can be varied dependent on embodiment, and there will not necessarily be sufficient space in the baton table to have a valid baton for all of the locks that may be used by the threads. If there is not a free entry, then the process proceeds directly to step 220, but assuming that there is a free entry, then an entry is created in the baton table for the baton being requested, and the active thread is set to be equal to the requesting thread.

Following step 215, or directly follow step 210 if there was no free entry, the destination register Ws is set equal to one. There are a number of ways in which this can be achieved, but in one embodiment this involves the baton maintenance circuitry instructing the execution pipeline to write one into the destination register Ws. Thereafter, at step 225, the requesting thread continues its execution. The steps then taken by the requesting thread will be discussed later with reference to FIG. 6.

Assuming a match was found at step 205, then this will indicate that there is already another thread that has been allocated the baton. Accordingly, at step 230, details of the requesting thread are added to the waiting threads list field 120 within the relevant baton table entry. At step 235, zero is written into the destination register Ws, for example by instructing the execution pipeline to write zero into the destination register. In addition, at step 240, the baton maintenance circuitry 35 causes the relevant bit within the active threads list 30 maintained by the control circuitry 25 to be cleared to identify that the requesting thread is now inactive. Accordingly, at step 245, the requesting thread stalls, awaiting the baton to be passed to it.

Figure 5:
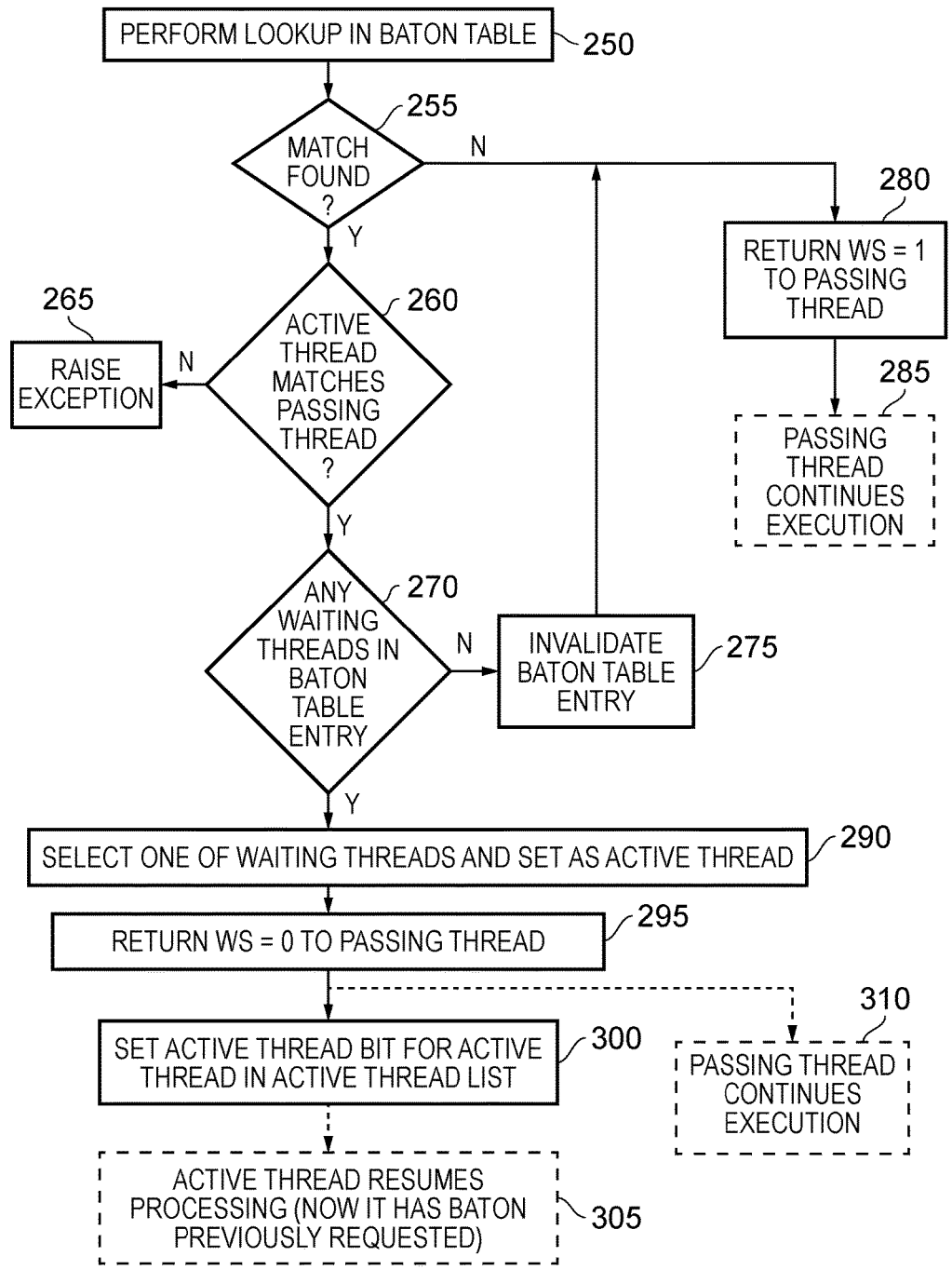
FIG. 5 is a flow diagram illustrating the steps performed by the baton maintenance circuitry in accordance with one embodiment, in response to a pass baton instruction being executed by a thread.

FIG. 5 is a flow diagram illustrating the steps performed by the baton maintenance circuitry when a pass baton request is issued by the execution pipeline in respect of a particular thread (referred to herein as the passing thread). In one particular embodiment, such functionality is implemented by including a pass baton instruction within the instruction sequence executed by a thread, so that once the critical code section has been performed, the pass baton instruction is then executed. As with the get baton instruction, the pass baton instruction specifies two fields, namely a tag field identifying the lock address of the associated lock, and a destination register field identifying a destination register Ws in which a control data value is written dependent on the analysis performed by the baton maintenance circuitry in response to the pass baton instruction.

At step 250, on execution of the pass baton instruction by the execution pipeline, a lookup is performed in the baton table 40 in order to determine whether an entry already exists for the lock identified by the pass baton instruction. It is then determined at step 255 whether a match has been found, and if so at step 260 it is determined whether the active thread ID stored in the active threads field 125 of the relevant entry matches the ID of the passing thread. This should be the case, assuming the software has been written correctly, but if this is not the case, then an exception is raised at step 265. In one embodiment, the active thread field 125 is not used, and step 260 is omitted. In an alternative embodiment, the active thread check using the active thread field can be incorporated within the match detection step 255, so that if the active thread ID stored in the active threads field 125 of the relevant entry does not match the ID of the passing thread, the process proceeds to step 280.

Following step 260, or directly following step 255 if step 260 is not implemented, it is then determined at step 270 where there are any waiting threads identified in the baton table entry. As discussed earlier with reference to FIG. 2A, any such waiting threads will be identified in the waiting threads list field 120 of the relevant entry. If there are no waiting threads, then the baton table entry is invalidated by clearing the associated valid bit field 105 at step 275. Thereafter, the process proceeds to step 280, where one is written into the destination register Ws. This step is also performed directly following a match not being found at step 255. Thereafter, the passing thread continues execution at step 285. The steps performed by the passing thread at this point will be discussed later with reference to FIG. 7.

Assuming at step 270 it is determined that there is at least one waiting thread in the baton table entry, then one of the waiting threads is selected and set as the active thread at step 290. There are a number of ways in which the thread can be selected. For example this could be done randomly, or could be done based on the order in which the threads requested the baton, so that the thread that has been waiting for the baton the longest gets allocated the baton first.

Following step 290, at step 295 zero is written into the destination register Ws, for example by instructing the execution pipeline to write the zero into the destination register. Thereafter, at step 300, the active thread bit for the active thread set at step 290 is set in the active thread list 30, to identify that that thread can now continue execution. Accordingly, the active thread then resumes processing at step 305. At this point, it has now been allocated the baton that it had previously requested via execution of a get baton instruction. As also indicated in FIG. 5, a passing thread can also continue execution at step 310 since it has successfully released the baton.

Figure 6:
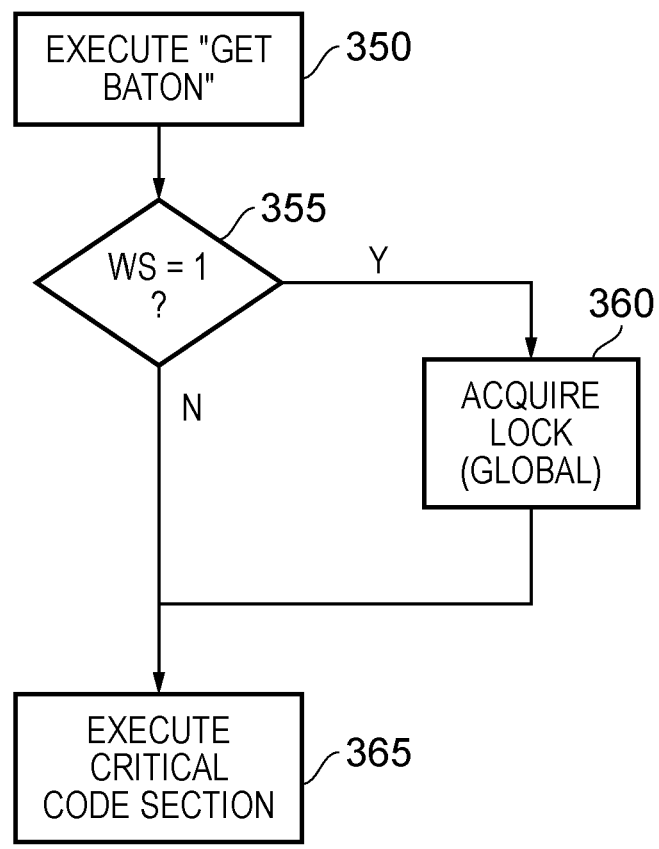
FIG. 6 is a flow diagram illustrating the steps performed by a thread following execution of a get baton instruction, in accordance with one embodiment.

FIG. 6 is a flow diagram illustrating the steps performed by a thread that is acquiring the baton. At step 350, the get baton instruction is executed. With reference to FIG. 4, this may result in the requesting thread continuing execution at step 225, due to a baton being created for it. Alternatively, the thread may initially stall at step 245 in FIG. 4, and will ultimately resume processing at step 305 in FIG. 5 once it has been passed the baton. Once the thread has acquired the baton, then at step 355, it will be determined whether the contents of the destination register Ws are equal to one. If so, then the process will proceed to step 360, where the global lock will be acquired using an atomic operation. Once the lock has been acquired, the process will then proceed to step 365, where the critical code section is executed. However, if at step 355, it is determined that the contents of the destination register Ws are not equal to one, then there will be no need for the lock to be acquired (since it will have previously been acquired, and not yet released) and accordingly the process can proceed directly to step 365, where the critical code section is executed.

Figure 7:
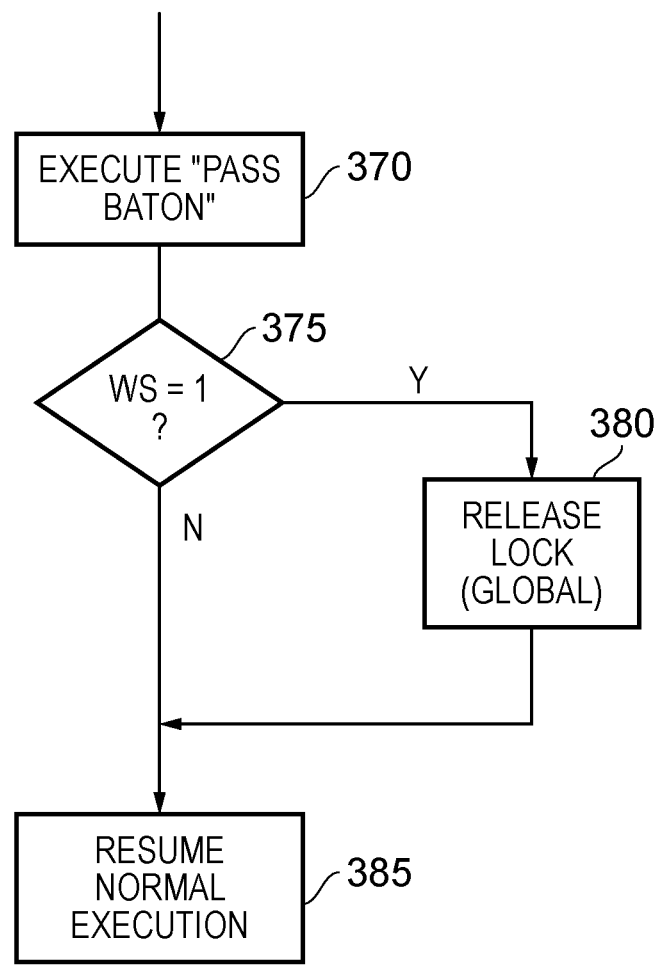
FIG. 7 is a flow diagram illustrating the steps performed by a thread in accordance with one embodiment, following execution of a pass baton instruction.

FIG. 7 is a flow diagram illustrating the steps performed by a thread that is releasing a baton. At step 370, the pass baton instruction is executed. This will then result in the passing thread continuing execution at either step 285 or step 310 of FIG. 5. At this point, it will then be determined at step 375 whether the destination register Ws is set equal to one. If it is, then at step 380 a process will be performed in order to release the global lock, whereafter normal execution can be resumed at step 385. However, if the destination register Ws is not equal to one, then there will be no need to release the lock, since the lock is continuing to remain acquired for use by another thread to which the baton has been passed, and accordingly the passing thread can merely proceed directly to resume normal execution at step 385.

Figure 8A:
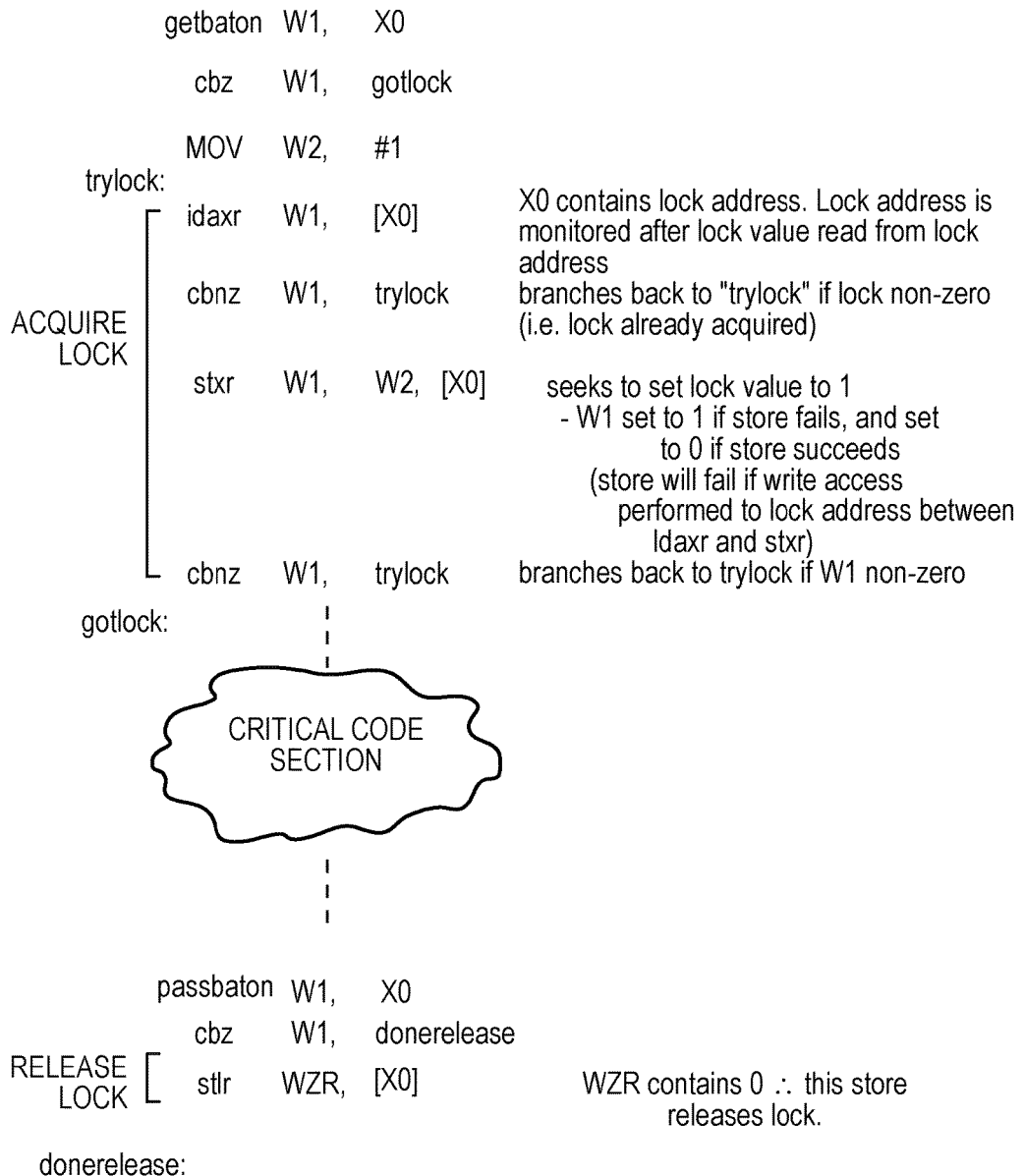
FIG. 8A illustrates an example code sequence using the get baton and pass baton instructions of one embodiment.

FIG. 8A schematically illustrates how the code sequence of FIG. 3 is modified in order to incorporate the get baton and pass baton instructions in accordance with the earlier described embodiment. In particular, the get baton instruction will specify the contents of X0 as the tag value, as mentioned earlier X0 containing the lock address. In this example, the destination register Ws is specified to be W1. A compare and branch if zero (cbz) instruction is then performed, which causes the instruction flow to branch to the got lock position if the contents of W1 are zero. As discussed earlier, if the contents of W1 are zero, this indicates that there is no need to acquire the lock, and accordingly the sequence of code required to atomically acquire the lock can be bypassed. Conversely, if the contents of W1 are not zero, then the execution continues directly to the move instruction and thereafter to the set of instructions used to atomically acquire the lock.

Once the critical code section has been executed, then the pass baton instruction is executed. This again uses the contents of the register X0 as an input operand, this identifying the lock address. The destination register is again specified to be the register W1. Thereafter, a compare and branch if zero instruction is executed, which will branch to the done release point in the code if the contents of W1 are zero. As will be apparent from the earlier discussion of FIGS. 5 and 7, this is the situation where the lock does not need to be released, and accordingly the store instruction used to release the lock can be bypassed.

Figure 8B:
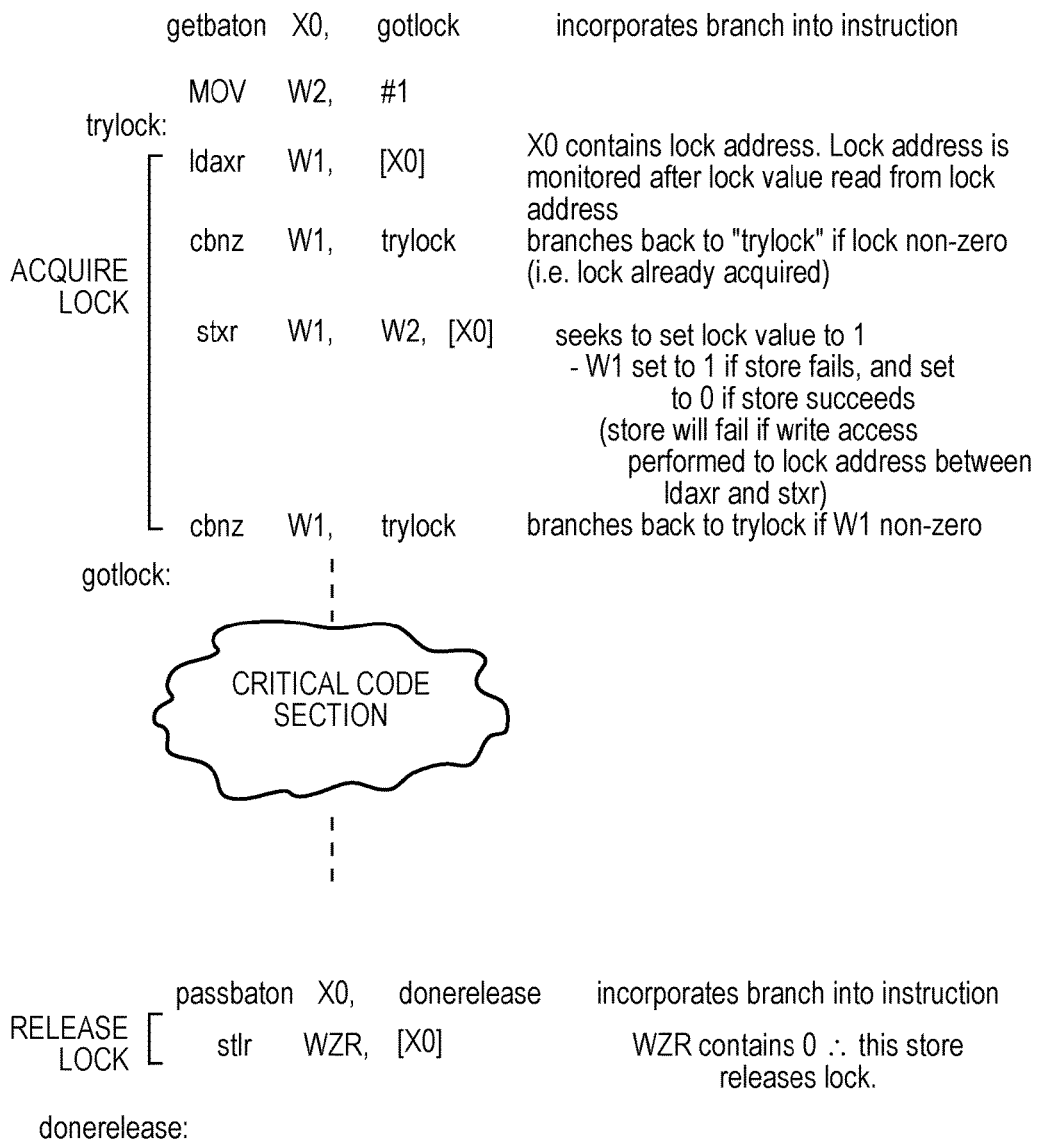
FIG. 8B illustrates an example code sequence using the get baton and pass baton instructions of another embodiment.

FIG. 8B illustrates an alternative implementation of the get baton and pass baton instructions, where the functionality of the subsequent cbz instruction is effectively incorporated into the get baton and pass baton instructions. Accordingly, not only is there no need to execute the subsequent cbz instruction, but in addition there is no need to capture the intermediate result in the register W1, hence avoiding any accesses to the register bank. Instead, the get baton instruction merely takes the value of X0 as an input operand, and performs all of the required processing to determine whether the lock needs to be acquired, or whether instead the process can branch directly to the got lock position. Hence, steps 220 and 235 of FIG. 4 do not need to be performed, and the functionality of FIG. 6 for determining whether to acquire the lock is incorporated within the execution of the get baton instruction.

Similarly, the pass baton instruction can incorporate the branch functionality, again using the contents of X0 as an input operand, and selectively branching to the done release point in the code dependent on the analysis performed by the baton maintenance circuitry. With reference to FIG. 5, steps 280 and 295 are accordingly no longer required, and the functionality of FIG. 7 for determining whether to release the lock is incorporated within the operation of the pass baton instruction.

Figure 9:
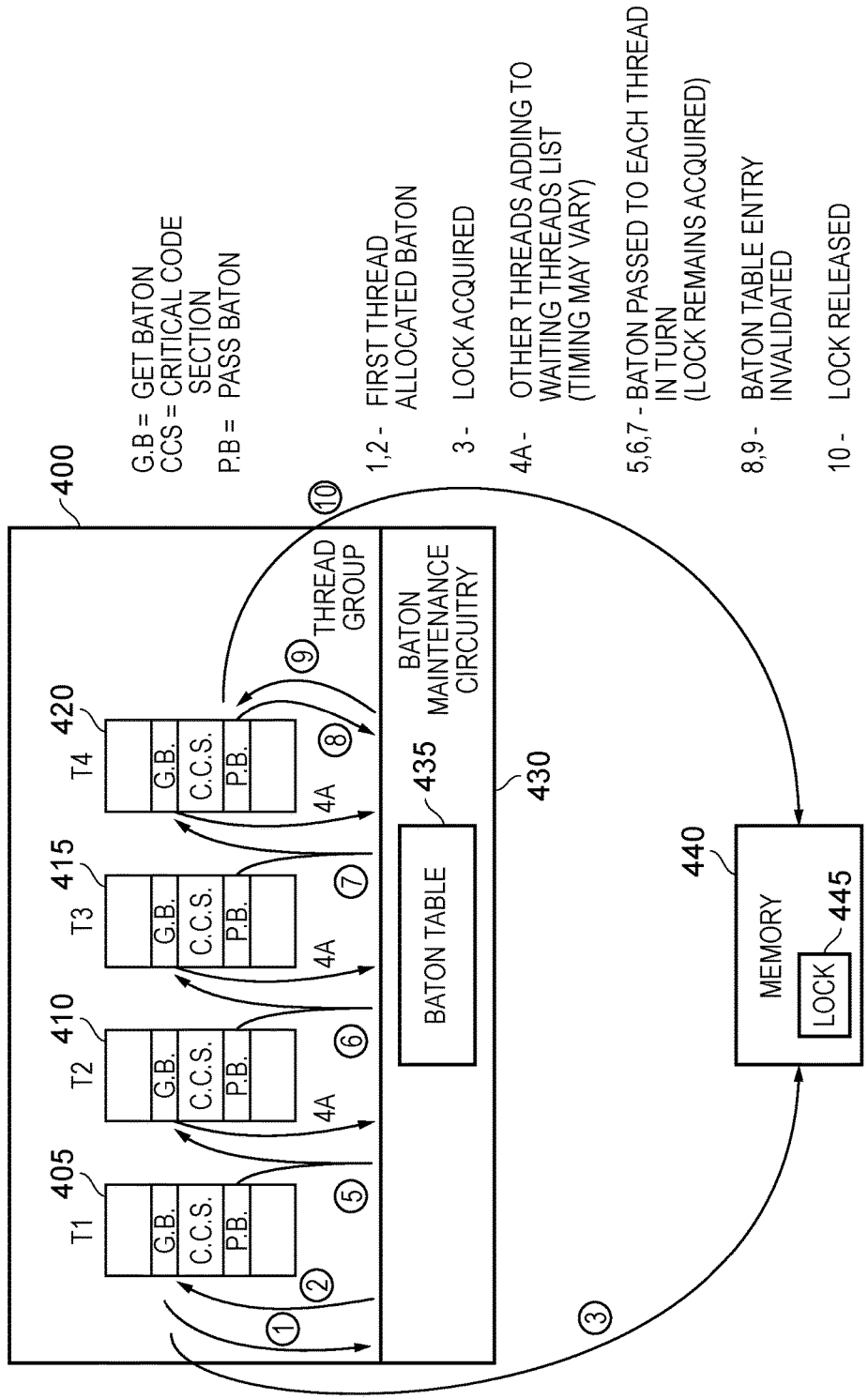
FIG. 9 schematically illustrates how the baton is passed between multiple threads of a thread group in accordance with one embodiment.

FIG. 9 schematically illustrates how the baton is passed between multiple threads in order to avoid repeated acquisition and releasing of the lock. In this example, the thread group consists of four threads 405, 410, 415, 420, all of which are configured to execute the same code sequence essentially in parallel. In one particular implementation, this is achieved by each of the threads having an associated program counter, but with the data processing apparatus also having a general program counter. At any point in time, an instruction is executed on all of the threads whose associated program counter matches the general program counter. By such an approach, execution of the various threads can remain in lock step, with the same instruction being executed across all of the threads. Such processing is referred to herein as SIMT processing.

However, when a critical code section is encountered, such lock step processing is not possible, since the lock has to be acquired to enable the critical code section to be performed, and the lock can only be acquired by one of the threads at a time. Accordingly, when the get baton instruction is encountered, only one of the threads will be successful in being allocated the baton. In the example illustrated in FIG. 9, this is assumed to be the first thread 405, as indicated by the arrows 1 and 2. In particular, the first thread's request for the baton is the successful request, causing an entry to be allocated in the baton table 435, and for the baton to be allocated to the first thread 405. At this point, the execution pipeline will then cause the lock 445 to be acquired from memory 440 as indicated by the arrow 3, the acquiring of the lock taking place using the earlier described techniques.

Once the lock has been acquired, the critical code section can be executed in respect of the first thread 405, and following execution a pass baton instruction is executed. This will involve a lookup being performed within the baton maintenance circuitry, and the baton then being allocated to one of the other pending threads. In this example, it is assumed that each of the other threads is identified in the waiting threads list 120, following execution of associated get baton instructions within those threads, as indicated by the arrows 4A. Whilst the timing may vary, in one particular embodiment, it is assumed that initially all four of the threads will have executed the get baton instruction at the same time, with only the first thread having successfully being allocated the baton, and accordingly all of the other threads will have been identified in the waiting threads list 120 for the relevant entry.

Accordingly, any of those pending threads can be allocated the baton at this stage, but for simplicity it is assumed that the threads are allocated the baton in sequential order, and accordingly the next thread 410 is allocated the baton at this point, as indicated by the arrow 5. At this point, the critical code section in respect of the second thread 410 can be executed without needing to reacquire the lock, since the lock is still acquired and has not been released. When the pass baton instruction is then executed in respect of thread 2, this causes the baton to be passed to the third thread 415, as indicated by the arrow 6. Again, the critical code section can be executed in respect of the third thread 415 without needing to reacquire the lock. When the pass baton instruction is executed in respect of the third thread 415, this causes the baton to be allocated to the fourth thread 420 as indicated by the arrow 7, and again the critical code section is performed without needing to reacquire the lock.

However, when the fourth thread 420 then executes the pass baton instruction, as indicated by the arrow 8, there will be no remaining entries in the waiting threads list, and accordingly at this point the baton table entry is invalidated, and a message returned to the fourth thread 420 (for example by writing one into the destination register Ws as discussed earlier with reference to FIG. 5), as indicated by the arrow 9, whereafter continued execution of the fourth thread causes the lock 445 to be released, as indicated by the arrow 10.

Figure 10:
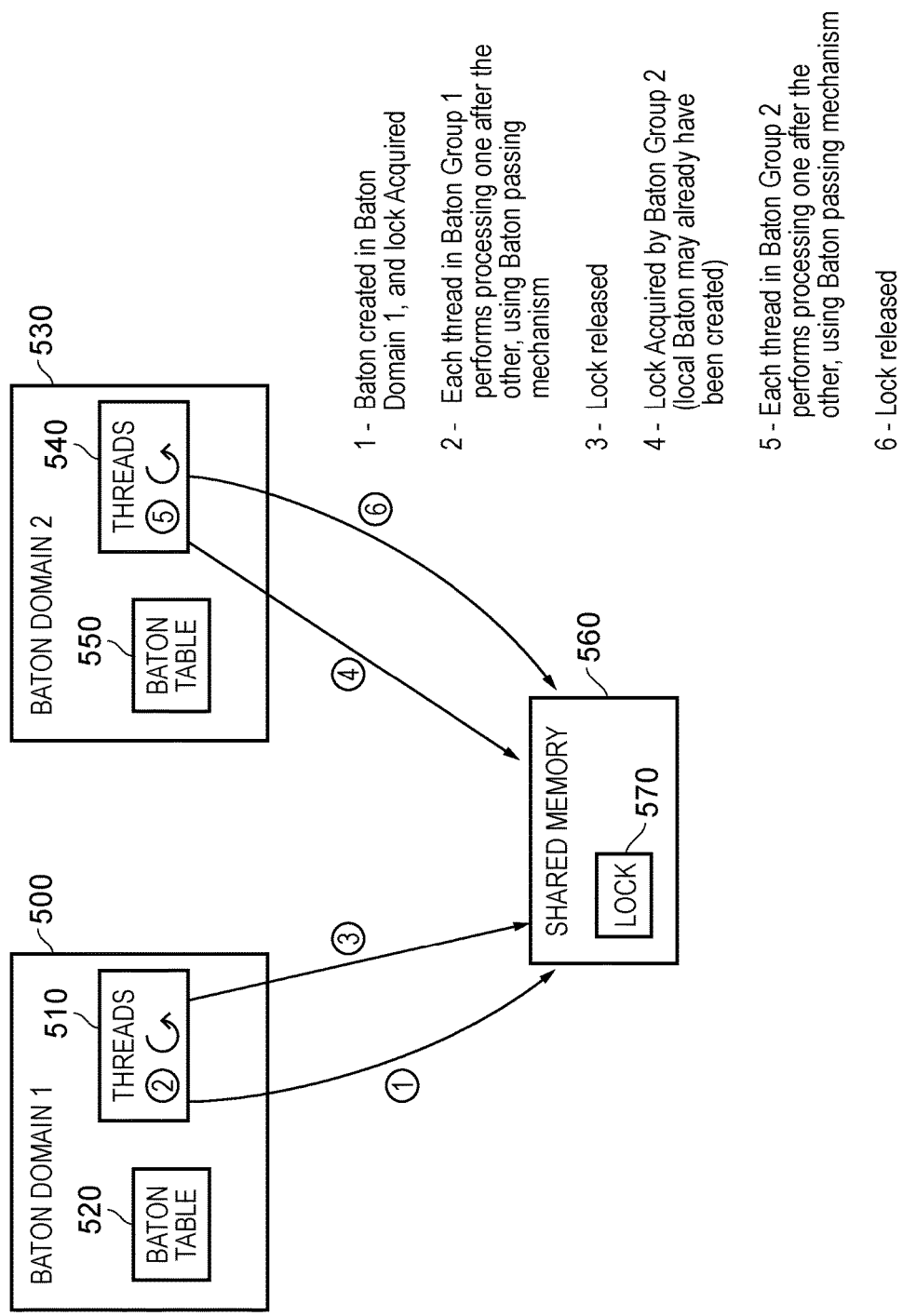
FIG. 10 schematically illustrates the use of multiple baton domains in accordance with one embodiment.

FIG. 10 illustrates how multiple baton domains can be established within the data processing apparatus. In particular, a separate baton table 520, 550 is provided for each baton domain 500, 530, each baton domain in this example including a plurality of threads 510, 540. Hence, in this example separate groups of threads can be allocated to different baton domains, each with their own associated baton table, and accordingly each with their own associated batons for a particular lock. In this example, it is assumed that a lock 570 in the shared memory 560 is used by both of the groups of threads 510, 540. However, in this example, it is assumed that the lock is first acquired by one of the threads within the thread group 510 of the first baton domain 500, as indicated by the arrow 1, and accordingly a baton table entry is established within the baton table 520. In accordance with the process described earlier with reference to FIG. 9, the lock can remain acquired for the threads of baton domain 1, allowing each of the threads within the thread group 510 to sequentially perform the critical code section associated with the lock, as indicated by the arrow 2. Only once all of those threads have executed the critical code section, is the lock then released, as indicated by the arrow 3.

Meanwhile, the threads within the thread group 540 may also have sought to request the baton, and indeed a baton table entry may have been created within the baton table 550, and a baton allocated to one of those threads. However, that first thread within the thread group 540 that has been allocated the baton will need to acquire the lock, and will have to wait for the lock to be released by the thread group 510 before it can acquire the lock, as indicated by the arrow 4. Once the lock has been acquired, then all of the threads within the thread group 540 can perform their critical code sections in sequence, via the local baton within the baton table 550 being passed between those threads whilst the lock 570 remains allocated, as indicated by the arrow 5. Following performance of the critical code section for all of the threads within the thread group 540, the lock can then be released, as shown by the arrow 6.

Figure 11:
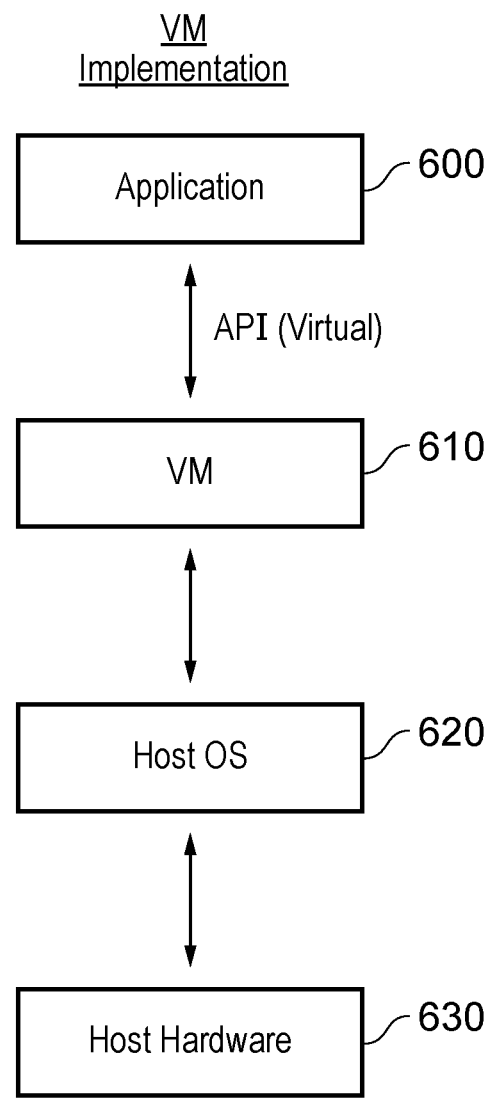
FIG. 11 schematically illustrates a virtual machine implementation of the data processing apparatus in accordance with one embodiment.

FIG. 11 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 630 typically running a host operating system 620 supporting a virtual machine program 610. Often, large powerful processors are required to provide virtual machine implementations which execute at a reasonable speed, but such an approach may be justified in certain circumstances, such as when there is a desire to run code native to another processor for compatibility or re-use reasons. The virtual machine program 610 is capable of executing an application program (or operating system) 600 to give the same results as would be given by execution of the program by such a real hardware device. Thus, the program instructions, including the get baton and pass baton instructions described above, may be executed from within the application program 600 using the virtual machine program 610.

From the above described embodiments, it will be appreciated that the baton mechanism of the described embodiments, where a baton forms a local proxy for the lock, allows lock-protected processing operations to be performed sequentially for multiple threads without the need for the individual threads to acquire and release the lock. Instead, the lock is acquired once, and then the lock-protected processing operation can be performed sequentially for each of the multiple threads whilst the lock remains acquired. Only once all of those multiple threads have performed the lock-protected processing operation is the lock then released.

Such an approach can significantly increase the performance of multi-threaded systems where the threads include lock-protected processing operations. It is particularly beneficial in association with thread groups of the type shown in FIG. 9, where each of the threads essentially executes the same code in lock step, and hence critical code sections requiring the same lock are encountered at essentially the same time. The described baton mechanism then enables the lock to be acquired once, whereafter the critical code section can be executed sequentially for each of the threads in the thread group, before the lock is then released. This increases the performance of the execution of the thread group, and also reduces energy consumption that would otherwise be associated with multiple accesses to the memory to seek to acquire and release the lock multiple times.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. A data processing apparatus for executing a plurality of threads, the data processing apparatus being coupled to memory via an interconnect, and comprising:

processing circuitry configured to perform processing operations required by said plurality of threads, said processing operations including a lock-protected processing operation with which a lock is associated, the lock needing to be acquired in memory before the processing circuitry performs the lock-protected processing operation;

baton maintenance circuitry configured to maintain a baton in association with the plurality of threads, the baton forming a proxy for the lock, and the baton maintenance circuitry being configured to allocate the baton between the plurality of threads; and a storage structure, separate from memory and associated with said plurality of threads, in which the baton maintenance circuitry is configured to maintain the baton;

the processing circuitry being configured to communicate with the baton maintenance circuitry so that, once the lock has been acquired in memory for one of said plurality of threads, the processing circuitry performs the lock-protected processing operation for multiple threads of said plurality of threads before the lock is released in memory, the baton maintenance circuitry being configured to identify a current thread amongst said multiple threads for which the lock-protected processing operation is to be performed by allocating the baton to that current thread;

wherein when the processing circuitry has performed the lock-protected processing operation for a thread, the processing circuitry is configured to issue a pass baton request to the baton maintenance circuitry, the baton maintenance circuitry being responsive to the pass baton request to determine whether there are any remaining threads amongst said multiple threads for which the lock-protected processing operation still needs to be performed, and if so, to allocate the baton to one of said remaining threads; and wherein each thread comprises a sequence of instructions, and for a thread that requires the lock-protected processing operation to be performed, the thread includes a pass baton instruction which is executed by the processing circuitry once the lock-protected processing operation has been performed for that thread, and which causes the processing circuitry to issue the pass baton request to the baton maintenance circuitry.

2. A data processing apparatus as claimed in claim 1, wherein the baton maintenance circuitry is configured to allocate the baton to one thread at a time.

3. A data processing apparatus as claimed in claim 1, wherein, for a requiring thread that requires the lock-protected processing operation to be performed, the processing circuitry is configured to request the baton maintenance circuitry to allocate the baton to that requiring thread, the baton maintenance circuitry being configured, if the baton is not currently allocated to another thread, to allocate the baton to the requiring thread and to cause the processing circuitry to acquire the lock.

4. A data processing apparatus as claimed in claim 3, wherein when the processing circuitry requests the baton maintenance circuitry to allocate the baton to a requiring thread that requires the lock-protected processing operation to be performed, the baton maintenance circuitry is configured, if the baton is currently allocated to another thread, to maintain in association with the baton an indication that that requiring thread is awaiting the baton, and to cause the processing circuitry to stall execution of that requiring thread whilst awaiting allocation of the baton.

5. A data processing apparatus as claimed in claim 3, wherein each thread comprises a sequence of instructions, and for a requiring thread that requires the lock-protected processing operation to be performed, the requiring thread includes a get baton instruction which when executed by the processing circuitry causes the processing circuitry to request the baton maintenance circuitry to allocate the baton to that requiring thread.

6. A data processing apparatus as claimed in claim 5, wherein execution of the get baton instruction causes control data to be stored in a register to indicate whether the baton maintenance circuitry requires the processing circuitry to acquire the lock.

7. A data processing apparatus as claimed in claim 5, wherein the sequence of instructions includes lock acquiring code, and execution of the get baton instruction causes processing to branch past the lock acquiring code if the baton maintenance circuitry does not require the processing circuitry to acquire the lock.

8. A data processing apparatus as claimed in claim 1, wherein if the baton maintenance circuitry determines that there are no remaining threads amongst said multiple threads for which the lock-protected processing operation still needs to be performed, the baton maintenance circuitry is configured to de-allocate the baton and to cause the processing circuitry to release the lock.

9. A data processing apparatus as claimed in claim 1, wherein execution of the pass baton instruction causes control data to be stored in a register to indicate whether the baton maintenance circuitry requires the processing circuitry to release the lock.

10. A data processing apparatus as claimed in claim 1, wherein the sequence of instructions includes lock releasing code, and execution of the pass baton instruction causes processing to branch past the lock releasing code if the baton maintenance circuitry does not require the processing circuitry to release the lock.

11. A data processing apparatus as claimed in claim 1, wherein the apparatus is configured to acquire the lock via performance of an atomic operation.

12. A data processing apparatus as claimed in claim 1, wherein the storage structure comprises an entry for the baton, the entry comprising a lock identifier field identifying the lock for which the baton is forming a proxy, and a remaining threads field identifying any remaining threads amongst said multiple threads for which the lock-protected processing operation still needs to be performed.

13. A data processing apparatus as claimed in claim 12, wherein said entry further comprises an active thread field identifying the thread currently allocated the baton.

14. A data processing apparatus as claimed in claim 1, wherein said processing operations include multiple lock-protected processing operations, at least some of which have different locks associated therewith, and the baton maintenance circuitry is configured to maintain, in association with the plurality of threads, a plurality of batons, each baton being a proxy for one of the locks.

15. A data processing apparatus as claimed in claim 14, wherein the storage structure comprises a plurality of entries, each entry being associated with a different baton.

16. A data processing apparatus as claimed in claim 1, wherein the data processing apparatus comprises one or more baton domains, and for each baton domain the baton maintenance circuitry is configured to maintain a separate baton to form a proxy for the lock in that baton domain.

17. A data processing apparatus as claimed in claim 16, wherein said plurality of threads form a thread group, and the processing circuitry is further configured to perform processing operations required by threads of at least one further thread group, the threads of said at least one further thread group also requiring the lock-protected processing operation to be performed.

18. A data processing apparatus as claimed in claim 17, wherein one baton domain comprises multiple thread groups, such that the baton maintenance circuitry is configured to maintain the same baton for those multiple thread groups.

19. A data processing apparatus as claimed in claim 17, wherein each thread group is in a different baton domain, such that the baton maintenance circuitry is configured to maintain a separate baton in association with each thread group.

20. A data processing apparatus as claimed in claim 17, wherein for at least one thread group, the plurality of threads within that thread group are processed in parallel with a common program being executed for each thread of the thread group.

21. A data processing apparatus as claimed in claim 1, wherein the processing circuitry is configured to perform the processing operations required by said plurality of threads according to Single Instruction Multiple Thread (SIMT) processing.

22. A method of executing a plurality of threads within a data processing apparatus, each thread comprising a sequence of instructions, the method comprising:

performing processing operations required by said plurality of threads within processing circuitry of the data processing apparatus, said processing operations including a lock-protected processing operation with which a lock is associated, the lock needing to be acquired in memory before the processing circuitry performs the lock-protected processing operation;

employing baton maintenance circuitry to maintain a baton in a storage structure separate from memory and associated with said plurality of threads, in association with the plurality of threads, the baton forming a proxy for the lock, and allocating the baton between the plurality of threads;

once the lock has been acquired in memory for one of said plurality of threads, performing the lock-protected processing operation for multiple threads of said plurality of threads before the lock is released in memory, and identifying to the processing circuitry a current thread amongst said multiple threads for which the lock-protected processing operation is to be performed by allocating the baton to that current thread; and when the lock-protected processing operation has been performed for a thread, issuing a pass baton request to the baton maintenance circuitry, the baton maintenance circuitry being responsive to the pass baton request to determine whether there are any remaining threads amongst said multiple threads for which the lock-protected processing operation still needs to be performed, and if so, to allocate the baton to one of said remaining threads; and for a thread that requires the lock-protected processing operation to be performed, the thread includes a pass baton instruction which is executed once the lock-protected processing operation has been performed for that thread, and which causes the pass baton request to be issued to the baton maintenance circuitry.

23. A data processing apparatus for executing a plurality of threads, comprising:

means for performing processing operations required by said plurality of threads, said processing operations including a lock-protected processing operation with which a lock is associated, the lock needing to be acquired in memory before the processing means performs the lock-protected processing operation;

means for maintaining a baton in association with the plurality of threads, the baton forming a proxy for the lock, and the means for maintaining a baton further for allocating the baton between the plurality of threads; and a storage structure, separate from memory and associated with said plurality of threads, in which the means for maintaining a baton is configured to maintain the baton;

the means for performing processing operations including means for communicating with the means for maintaining a baton so that, once the lock has been acquired in memory for one of said plurality of threads, the means for performing processing operations performs the lock-protected processing operation for multiple threads of said plurality of threads before the lock is released in memory, the means for maintaining a baton including means for identifying a current thread amongst said multiple threads for which the lock-protected processing operation is to be performed by allocating the baton to that current thread;

wherein when the means for performing processing operations has performed the lock-protected processing operation for a thread, the means for performing processing operations is configured to issue a pass baton request to the baton maintenance circuitry, the means for maintaining a baton being responsive to the pass baton request to determine whether there are any remaining threads amongst said multiple threads for which the lock-protected processing operation still needs to be performed, and if so, to allocate the baton to one of said remaining threads; and wherein each thread comprises a sequence of instructions, and for a thread that requires the lock-protected processing operation to be performed, the thread includes a pass baton instruction which is executed by the means for performing processing operations once the lock-protected processing operation has been performed for that thread, and which causes the means for performing processing operations to issue the pass baton request to the means for maintaining a baton.

24. A computer program product storing in a non-transitory form a computer program for controlling a computer to provide a virtual machine execution environment for program instructions corresponding to a data processing apparatus as claimed in claim 1.

* * * * *